US 8,218,893 B2

United States Patent
Lim et al.

(10) Patent No.: US 8,218,893 B2
(45) Date of Patent: Jul. 10, 2012

(54) IMAGE INPAINTING METHOD AND APPARATUS BASED ON VIEWPOINT CHANGE

(75) Inventors: Hwa-sup Lim, Hwaseong-si (KR); Jae-young Sim, Yongin-si (KR); Do-kyoon Kim, Seongnam-si (KR); Kee-chang Lee, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 882 days.

(21) Appl. No.: 12/216,379

(22) Filed: Jul. 2, 2008

(65) Prior Publication Data
US 2009/0190852 A1 Jul. 30, 2009

(30) Foreign Application Priority Data
Jan. 28, 2008 (KR) .................. 10-2008-0008728

(51) Int. Cl.
*G06K 9/40* (2006.01)
(52) U.S. Cl. ..................................... 382/266
(58) Field of Classification Search .............. 345/422; 348/E13.002; 382/199, 266; 702/166; 715/781
See application file for complete search history.

(56) References Cited

U.S. PATENT DOCUMENTS

| | | | |
|---|---|---|---|
| 5,694,331 A * | 12/1997 | Yamamoto et al. | 345/428 |
| 6,097,394 A * | 8/2000 | Levoy et al. | 345/419 |
| 6,856,314 B2 * | 2/2005 | Ng | 345/421 |
| 7,167,172 B2 | 1/2007 | Kaus et al. | |
| 2002/0171666 A1 * | 11/2002 | Endo et al. | 345/619 |
| 2006/0078180 A1 * | 4/2006 | Berretty et al. | 382/128 |
| 2007/0057944 A1 * | 3/2007 | Redert | 345/422 |
| 2009/0115780 A1 * | 5/2009 | Varekamp et al. | 345/419 |

FOREIGN PATENT DOCUMENTS

| | | |
|---|---|---|
| JP | 06-074731 | 3/1994 |
| JP | 06074731 A * | 3/1994 |
| JP | 2005-190308 | 7/2005 |

* cited by examiner

*Primary Examiner* — Gregory F Cunningham
(74) *Attorney, Agent, or Firm* — Staas & Halsey LLP

(57) ABSTRACT

Provided is a method and apparatus for inpainting a depth image and a color image seen from one viewpoint by using a depth image and a color image inpainted from another viewpoint. The method includes detecting an edge on the basis of a difference between depth values of pixels in a first image seen from a view viewpoint and inpainting depth values of pixels in an occlusion region that is shown in a second image seen from a second viewpoint but not shown in the first image, in a direction from pixels in a region having high depth values among regions forming the edge to pixels in a region having low depth values.

19 Claims, 5 Drawing Sheets

FIG. 4A  FIG. 4B
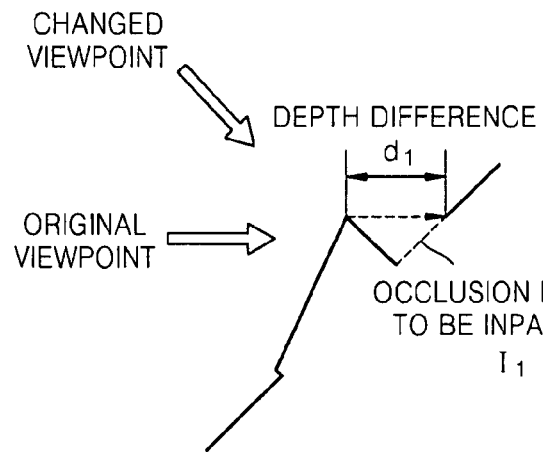
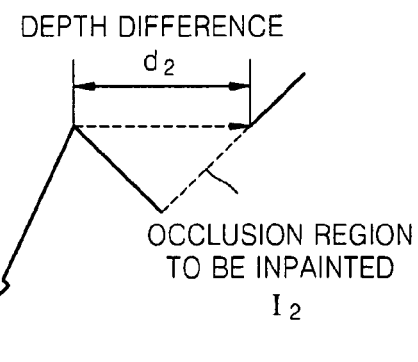
FIG. 5A  FIG. 5B
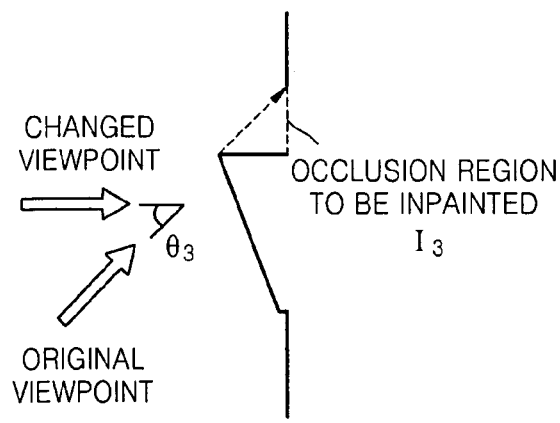
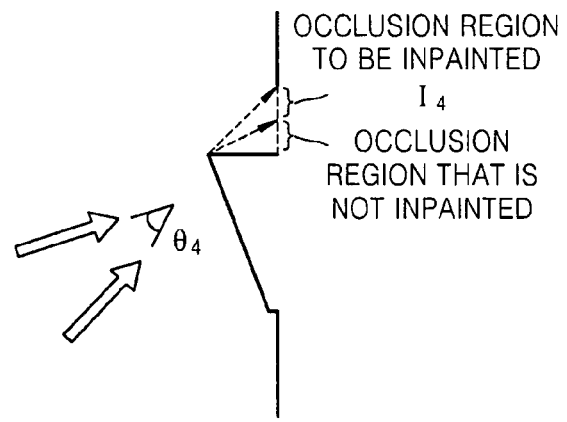

IMAGE INPAINTING METHOD AND APPARATUS BASED ON VIEWPOINT CHANGE

CROSS-REFERENCE TO RELATED APPLICATIONS

This application claims the benefit of Korean Patent Application No. 10-2008-0008728, filed on Jan. 28, 2008, in the Korean Intellectual Property Office, the disclosure of which is incorporated herein in its entirety by reference.

BACKGROUND

1. Field

One or more embodiments of the present invention relate to an image inpainting method and apparatus, and more particularly, to an image inpainting method and apparatus capable of representing a scene according to a change in viewpoint change by using a depth image and a color image corresponding to the depth image.

2. Description of the Related Art

A region of an object seen from a viewpoint and represented by a depth image and a corresponding color image is different from the same region of the object seen from another viewpoint and represented by another depth image and a corresponding color image. Specifically, when a viewpoint from which an object is seen is changed, a portion not shown before the viewpoint is changed may be shown. Therefore, the difference between the regions of the object occurs. Here, in a case where the viewpoint is moved forwards and backwards with respect to the object, there is no region that is newly shown due to the change in viewpoint, so that a depth value and a color value of the region that is not shown from the original viewpoint are not needed. However, in cases of other viewpoint changes, the region that is not shown from the original viewpoint may be shown after the viewpoint changes, so that the depth value and the color value of the region that is not shown from the original viewpoint are needed. Specifically, when a depth image and a color image of an object seen from a predetermined viewpoint of a camera are acquired, a portion of the object may be hidden behind another object, and this means there is a region of the object that is not shown from the viewpoint.

SUMMARY

One or more embodiments of the present invention provide a method and apparatus for inpainting a depth image and a color image after a viewpoint is changed by using a depth image and a color image corresponding to a viewpoint. In addition, embodiments of the present invention also provide a computer-readable medium having embodied thereon a computer program for the method.

Additional aspects and/or advantages will be set forth in part in the description which follows and, in part, will be apparent from the description, or may be learned by practice of the invention.

According to an aspect of embodiments of the present invention, there is provided an image inpainting method including detecting an edge on the basis of a difference between depth values of pixels in a first image seen from a first viewpoint and inpainting depth values of pixels in an occlusion region that is shown in a second image seen from a second viewpoint but not shown in the first image, in a direction from pixels in a region having high depth values among regions forming the edge to pixels in a region having low depth values.

According to another aspect of embodiments of the present invention, there is provided a computer-readable medium having embodied thereon a computer program for the image inpainting method.

According to another aspect of embodiments of the present invention, there is provided an image inpainting apparatus including an edge detector detecting an edge on the basis of a difference between depth values of pixels in a first image seen from a first viewpoint and a depth value inpainting unit inpainting depth values of pixels in an occlusion region that is shown in a second image seen from a second viewpoint but not shown in the first image, in a direction from pixels in a region having high depth values among regions forming the edge to pixels in a region having low depth values.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates a difference between sizes of occlusion regions to be inpainted, which is proportional to a difference between depth values of regions forming an edge, when depth values of pixels values in the occlusion regions are inpainted;

FIG. 5 illustrates a difference between sizes of occlusion regions to be inpainted, which is proportional to a degree of change in viewpoint, when depth values of the occlusion regions are inpainted.

DETAILED DESCRIPTION OF THE EMBODIMENTS

Figure 1:
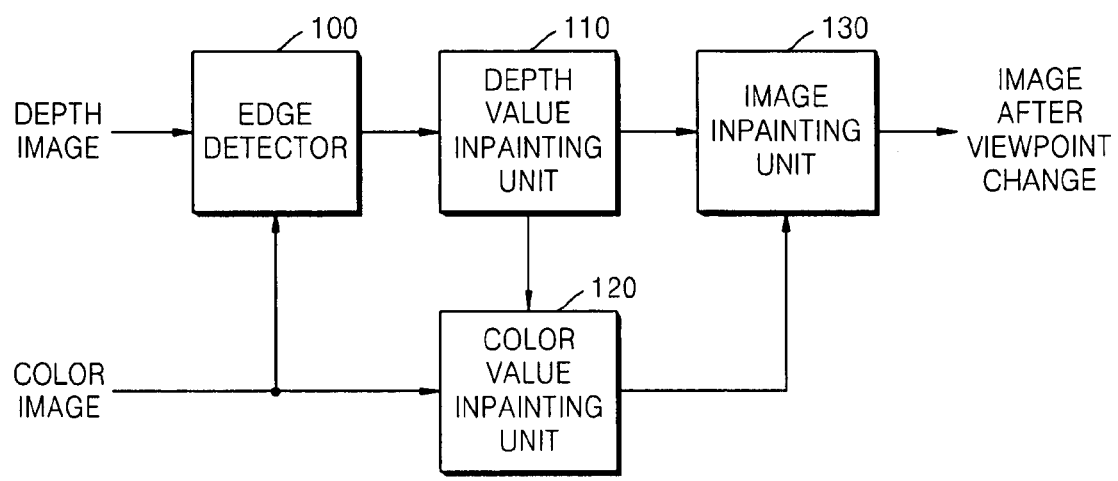
FIG. 1 illustrates an apparatus for inpainting a depth image and a color image after a change in viewpoint from which an object is seen by using a depth image and a color image before the change in viewpoint.

Reference will now be made in detail to the embodiments, examples of which are illustrated in the accompanying drawings, wherein like reference numerals refer to the like elements throughout. The embodiments are described below to explain the present invention by referring to the figures.

A depth image used in an embodiment of the present invention is defined as an image having depth information. The depth information stores a distance from a predetermined viewpoint to an object represented in the depth image. In an image seen from a viewpoint, an object may be hidden behind another object having a depth value smaller than that of the former. In other words, seen from a viewpoint, an object closer to the viewpoint covers a portion of a farther object.

In a case where a depth image and a color image after a change in viewpoint are to be inpainted by using a depth image and a color image obtained from a viewpoint, if a portion that is not shown before the viewpoint change is shown after the viewpoint change, depth information and color information on the portion are to be inpainted from the depth image and the color image before the viewpoint change. When a region of an object in an image is hidden by an object having a depth value lower than that of the former, the region may not be shown from a predetermined viewpoint. This region is referred to as an occlusion region. A size of the occlusion region is determined according to a degree of change in viewpoint and a difference between the depth values of the objects. By combining an image inpainted by inpainting a depth value and a color value of the occlusion region with a depth image and a color image seen from the viewpoint after the viewpoint change, an image after the viewpoint change can be obtained. More specifically, if the depth image and the color image after the viewpoint change are three-dimensionally modeled by using the depth image and the color image from the original viewpoint, depth information and color information on the occlusion region that is not shown from the original viewpoint do not exist. Therefore, for the perfect inpainting, the depth information and the color information are needed. Therefore, according to an embodiment of the present invention, by inpainting the depth information and the color information on the occlusion region and combining the inpainted information with the depth image and the color image after the viewpoint change which can be acquired from the depth image and the color image from the original viewpoint, a 3D image after the viewpoint change can be obtained. Hereinafter, an embodiment of an apparatus for inpainting the depth value and the color value of the occlusion region is described.

FIG. 1 illustrates an apparatus for inpainting a depth image and a color image after a change in viewpoint from which an object is seen by using a depth image and a color image before the change in viewpoint. Referring to FIG. 1, the image inpainting apparatus according to the current embodiment includes an edge detector 100, a depth value inpainting unit 110, a color value inpainting unit 120, and an image inpainting unit 130.

The edge detector 100 detects an edge on the basis of depth values extracted from a depth image. The edge can be found by detecting a portion where depth values of pixels in the depth image are discontinuous. The detection of the discontinuous portion is performed by determining a portion having a difference between depth values of adjacent pixels greater than or equal to a predetermined threshold to be the discontinuous portion. Here, the threshold may be set by the user and may vary according to the image resolution.

Specifically, when a viewpoint from which an object is seen is changed, an occlusion region is shown. Since the occlusion region exists at an edge, in order to inpaint the occlusion region that is shown after the viewpoint change by using a depth image before the viewpoint change, the image inpainting apparatus detects the edges to find a portion where the occlusion region exists. A method of detecting the edge is not limited to detecting the edge from the depth image and may include detecting the edge from a color image, or simultaneously considering edges detected from both of the depth image and the color image. Here, a correspondence relationship between the color image and the depth image has to be defined per pixel.

The depth value inpainting unit 110 compares depth values of regions forming the detected edge with each other and inpaints depth values of pixels in the occlusion region in a direction from pixels at an edge of a region having high depth values to pixels at an edge of a region having low depth values. Here, depth values of the pixels in the occlusion region may be linearly inpainted in consideration of continuity with the depth values of the pixels at the edge of the region having high depth values. However, embodiments of the present invention are not limited thereto, and any method of determining a depth value corresponding to a region forming an edge can be used.

The depth value inpainting unit 110 determines a direction of inpainting the depth values of the occlusion region and a size of a region having the depth values to be inpainted, and inpaints the depth values of the pixels in the occlusion region. The depth value inpainting unit 110 outputs the determined inpainting direction and the size of the region to be inpainted to the color value inpainting unit 120 so that the direction and the size are used to inpaint color values of the occlusion region. Now, a method of determining the direction of inpainting the depth values and a method of determining the size of the region having the depth values to be inpainted are described in detail.

The occlusion region occurs when an object is hidden by another object closer to a viewpoint than the former. Therefore, when the viewpoint is continuously changed, a region that is predicted to be shown in the image appears from a portion far from the viewpoint. Therefore, the depth value inpainting for the occlusion region starts with the pixels at the edge of the region having high depth values among the regions forming the edge. Here, the depth values are inpainted in a direction from the pixels at the edge of the region having high depth values among the regions forming the edge to the pixels at the edge of the region having low depth values. In other words, the depth value inpainting is started with one of the pixels at the edge of the region having high depth values among the regions forming the edge, and when the depth value inpainting arrives at one of the pixels at the edge of the region having low depth values among the regions forming the edge, the inpainting is ended. Thereafter, for other pixels at the edge of the region having high depth values among the regions forming the edge, the depth value inpainting is performed as described above.

The direction of inpainting the depth values of the pixels beginning from the pixels at the edge of the region having the high depth values can be changed according to an inpainting algorithm or a depth value distraction of adjacent images. For example, when the depth value distribution of the region adjacent to the edge is changed with a specific pattern, an algorithm of inpainting the depth value of the occlusion region may be determined by using the specific pattern. The method of inpainting the depth values in the occlusion region is described in detail with reference to FIG. 2.

FIGS. 2a-2d illustrate an example of the method of determining the direction of inpainting the depth values.

Figure 2A:
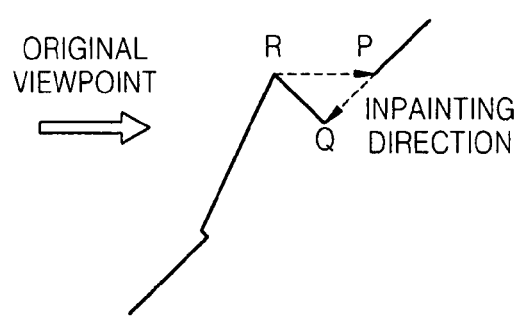
FIG. 2 illustrates an example of a method of determining a direction of inpainting a depth value.

FIG. 2a illustrates an occlusion region that occurs when an object is seen from an original viewpoint and a direction of inpainting the allocation region, not shown in the original viewpoint, after a viewpoint change. A point R is one of pixels forming an edge detected from a depth image. A straight line connecting the original viewpoint to the point R intersects a pixel having a depth value higher than that of the point R, the pixel is determined as a point P. In addition, a point at which a straight line connecting a changed viewpoint to the point R intersects a pixel in a direction of inpainting from the point P is determined as a point Q. In an image seen from the changed viewpoint, the point R and the point Q represent the same pixel. A depth value of the point Q may be higher, lower, or the same as that of the point P according to the depth value distribution adjacent to the occlusion region. A region between the points P and Q represents a region to be inpainted, that is, the occlusion region. Here, as the direction of inpainting the depth values of the pixels existing in the region to be inpainted, the depth value inpainting is performed in a direction from the point P to the point Q.

Figures 2B, 2C, 2D:
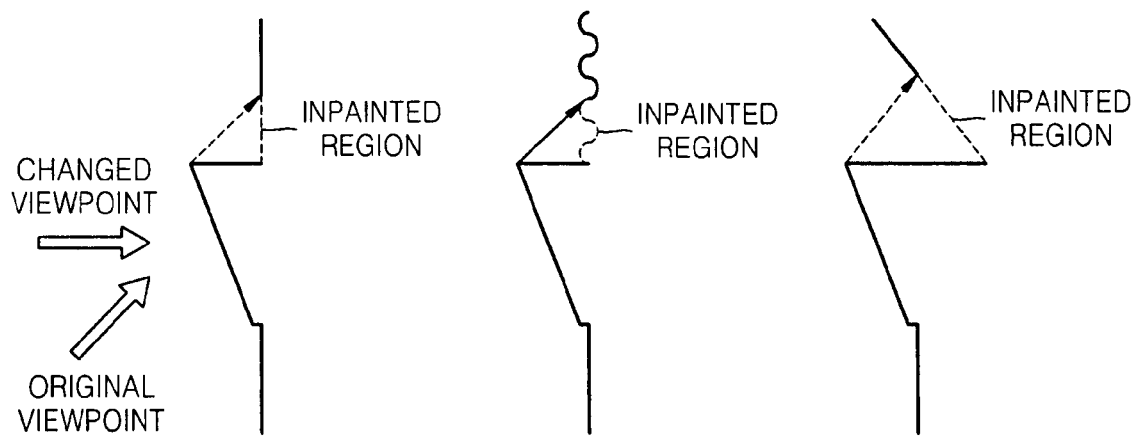

The depth value distribution between the points P and Q may be determined by using various methods. FIGS. 2b, 2c, and 2d illustrate operations of inpainting the depth value distributions between the points P and Q with reference to depth value distributions of adjacent regions.

FIG. 2b illustrates the inpainted occlusion region after a viewpoint is changed from the original viewpoint illustrated in FIG. 2a. Here, the depth values in the occlusion region correspond to pixels at the straight line connecting the point P to the point Q on the basis of the depth value distribution of the adjacent region. FIG. 2c illustrates a method of determining the depth values in the occlusion region when the depth value distribution of the region adjacent to the occlusion region has a shape of a wave. FIG. 2d illustrates a case where the depth value of the point Q is higher than that of the point P. As described above, the depth values of the pixels inpainted to inpaint the occlusion region may be determined by using the depth values of the pixels adjacent to the occlusion region.

FIG. 3 conceptually illustrates another example of the method of determining the direction of inpainting the depth values.

Figure 3A:
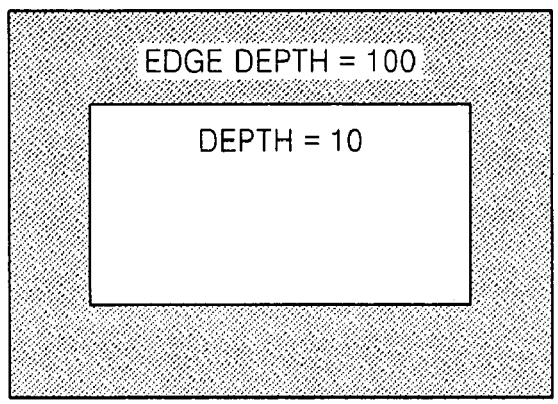
FIG. 3 conceptually illustrates another example of the method of determining a direction of inpainting a depth value.

FIG. 3a is a view illustrating an image of objects seen from an original viewpoint. When it is assumed that a depth value of a region close to the viewpoint is 10 and a depth value of a region far from the viewpoint is 100, an edge is formed by a combination of the two regions. A depth value of the edge formed by the two regions is 100, that is, the depth value of the region farther from the viewpoint. Depth values in an occlusion region can be linearly obtained in consideration of continuity with the depth values of the edge. However, embodiments of the present invention are not limited thereto.

Figure 3B:
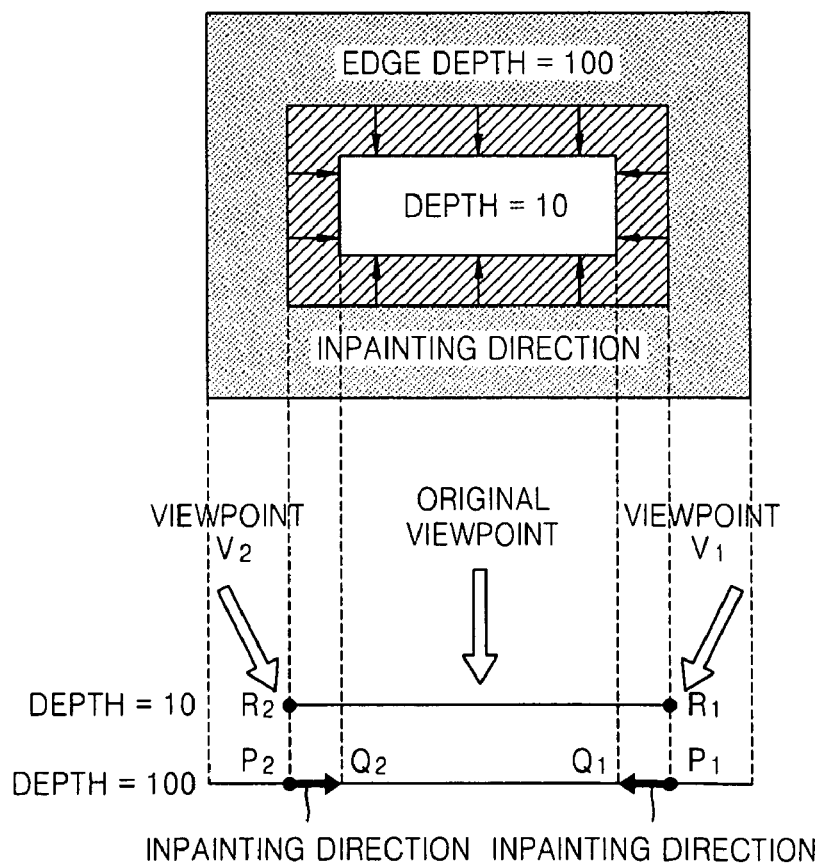

FIG. 3b is a view illustrating a direction of inpainting depth values when a viewpoint is changed from the original viewpoint. The original viewpoint may be changed to a viewpoint V1 or V2. Now, a case where the original viewpoint is changed to the viewpoint V1 is described. A point R1 and a point P1 are represented as the same pixel in an image seen from the original viewpoint and have the same coordinates on the image, however, the points R1 and P1 have different depth values. When the viewpoint is changed to the viewpoint V1, by using a depth value distribution adjacent to an occlusion region between the points P1 and Q1 and a straight line connecting the viewpoint V1 to the point R1, the point Q1 can be determined. In addition, the depth value inpainting is started with the point P1 and is performed until the depth value inpainting arrives at a point on the straight line connecting the viewpoint V1 to the point R1. The determination of the point Q1 is performed so that the depth values of the pixels in the occlusion region are determined in consideration of the adjacent depth value distribution by using the point P1 as a start point and a point which intersects the straight line connecting the viewpoint V1 to the point R1 is determined as the point Q1. In a case where the original viewpoint is changed to the viewpoint V2, the inpainting of an occlusion region may be performed in a similar manner to the case where the original viewpoint is changed to the viewpoint V1.

As described above, the direction of inpainting the depth values in the occlusion region is determined. Now, determining a size of a region to be inpainted to inpaint the occlusion region is described below.

The size of the region having depth values to be inpainted may be determined by considering the difference between depth values of regions forming an edge and the degree of change in viewpoint. Specifically, as the difference between the depth values of the regions forming the edge increases, and the degree of change in viewpoint increases, the size of the region having the depth values to be inpainted increases.

FIGS. 4a-4b illustrate a difference between sizes of occlusion regions to be inpainted, which is proportional to a difference between depth values of regions forming an edge, when depth values of pixels in the occlusion regions are inpainted.

FIG. 4a illustrates an occlusion region 11 to be inpainted when a difference between depth values of regions forming an edge is d1. FIG. 4b illustrates an occlusion region 12 to be inpainted when a difference between depth values of regions forming an edge is d2 from the same viewpoint as that in FIG. 4a. It can be seen that the occlusion region 12 is larger than the occlusion region 11, thus illustrating how the size of the occlusion region to be inpainted is proportional to the difference between the depth values.

FIGS. 5a-5b illustrate a difference between sizes of occlusion regions to be inpainted, which is proportional to a degree of change in viewpoint, when depth values of the occlusion regions are inpainted.

FIG. 5a illustrates an occlusion region 13 to be inpainted corresponding to a difference $\theta_3$ between an original viewpoint and a changed viewpoint. FIG. 5b illustrates an occlusion region 14 to be inpainted corresponding to a difference $\theta_4$ between an original viewpoint and a changed viewpoint. It can be seen that the occlusion region 13 corresponding to the difference $\theta_3$ is larger than the occlusion region 14 corresponding to the difference $\theta_4$. In addition, as illustrated in FIG. 5b, it can be seen that an occlusion region that is still not inpainted exists as compared with FIG. 5a. Therefore, the size of the occlusion region to be inpainted is proportional to the degree of change in viewpoint.

Referring again to FIG. 1, the color value inpainting unit 120 inpaints color values of pixels in an occlusion region. There are various methods of inpainting the color values of the occlusion region. For example, there is a method of copying a region estimated as a region similar to the occlusion region from images including the occlusion region and also there is a method of inpainting the color values in the occlusion region considering the continuity between the occlusion region and an adjacent region. A direction of the color value inpainting unit 120 to inpaint the color values is similar to the direction of inpainting the depth values, and a region having color values to be inpainted may be the same as the region having depth values to be inpainted.

The image inpainting unit 130 inpaints the occlusion region by using the inpainted depth values and color values and generates a 3D image by combining the inpainted occlusion region with the image seen from the changed viewpoint. When a 3D model is generated according to a viewpoint change by using the image inpainting apparatus according to an embodiment of the present invention, the occlusion region that was previously not shown from a previous viewpoint is inpainted, so that a natural 3D model can be generated.

Figure 6:
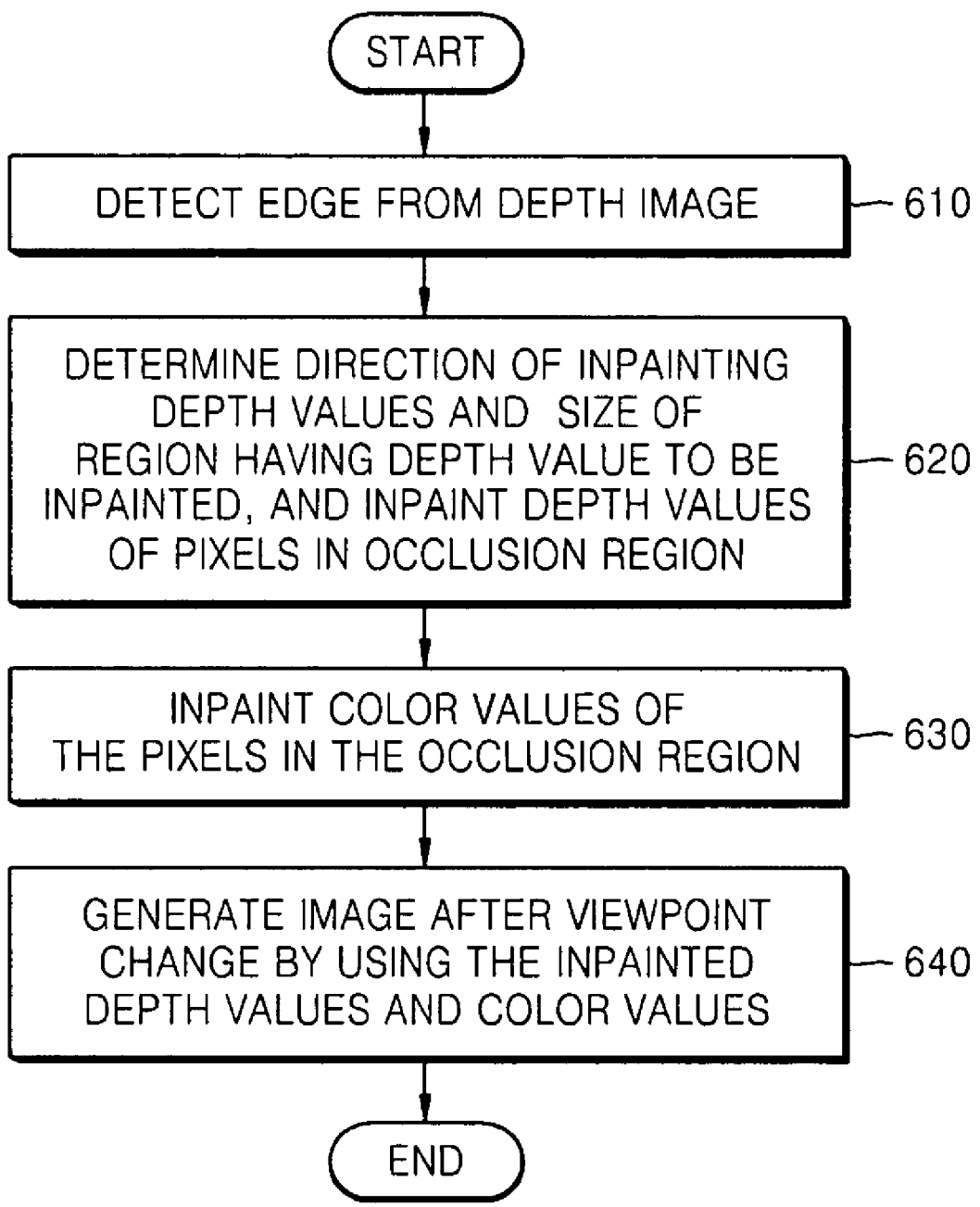
FIG. 6 illustrates a method of inpainting a depth image and a color image after a change in viewpoint from which an object is seen, by using a depth image and a color image before the viewpoint change, according to an exemplary embodiment of the present invention.

FIG. 6 illustrates a method of inpainting a depth image and a color image after a change in viewpoint from which an object is seen, by using a depth image and a color image before the viewpoint change, according to an embodiment of the present invention.

Referring to FIG. 1, the method of inpainting the image according to an embodiment of the present invention includes time-series operations performed by the image inpainting apparatus illustrated in FIG. 1. Therefore, a description of the apparatus for inpainting the image after the viewpoint change can be applied to the method of inpainting the image according to an embodiment of the present invention.

Referring now to FIG. 6, in operation 610, the image inpainting apparatus detects an edge on the basis of depth values extracted from a depth image. The edge may be found by detecting a portion where depth values of adjacent pixels forming the depth image are discontinuous. A method of detecting the edge is not limited to detecting the edge from the depth image and may include detecting the edge from a color image, or simultaneously considering edges detected from both the depth image and the color image. In this case, a correspondence relationship between the color image and the depth image per pixel would be defined.

In operation 620, the image inpainting apparatus determines the direction of inpainting depth values of pixels in the occlusion region and the size of a region having the depth values to be inpainted, and inpaints the depth values on the basis of the determined direction and size.

The method of inpainting the depth values in the occlusion region is described in detail. First, the direction of inpainting the depth values is determined. The occlusion region occurs when an object is hidden by another object closer to a viewpoint than the former. Therefore, the depth values are inpainted in a direction from pixels at an edge of a region having high depth values among regions forming the edge to pixels at an edge of a region having low depth values. The direction of inpainting the depth values may be used as a direction of inpainting color values of the occlusion region. However, the direction of inpainting the color values may be determined according to embodiments of the present invention.

Second, when the direction of inpainting the depth values of the occlusion region is determined, a size of a region having depth values to be inpainted in the occlusion region is determined in consideration of the changed viewpoint. As a difference between the depth values of the regions forming the edge increases, and a degree of change in the viewpoint increases, the size of the occlusion region is increased. Therefore, the difference between the depth values of the regions forming the edge and the degree of the change in the viewpoint is proportional to the size of the occlusion region.

In operation 630, the image inpainting apparatus inpaints color values of pixels in the occlusion region. There are various methods of inpainting the color values of the pixels in the occlusion region. For example, there is a method of copying a region estimated as a region similar to the occlusion region from images including the occlusion region and also there is a method of inpainting the color values of the occlusion region in consideration of continuity between the occlusion region and an adjacent region. However, in addition to the examples of the color value inpainting method, any color value inpainting method can be used according to embodiments of the present invention. A region having color values to be inpainted in the occlusion region is the same as the region having the depth values to be inpainted in operation 620. The color value inpainting for the pixels in the occlusion region in operation 630 and the depth value inpainting for the pixels in the occlusion region may be simultaneously performed. Otherwise, any one of the two is performed ahead of the other one.

In operation 640, the image inpainting apparatus generates a 3D image by combining the result of inpainting the depth values and the color values of the pixels in the occlusion region with an image seen from a changed viewpoint. The image seen from the changed viewpoint is obtained by using the depth values and the color values inpainted from the image seen from the original viewpoint. Therefore, in order to naturally represent the occlusion region that is shown in the image after the viewpoint change, the depth values and the color values inpainted in operations 620 and 630 are used.

In the image inpainting method according to embodiments of the present invention, when a 3D image is generated according to a viewpoint change, an occlusion region that is not shown from a previous viewpoint is inpainted. Therefore, a natural 3D image can be generated when the viewpoint is changed. In addition, in a case where a color image and a depth image can be inpainted in real-time, the occlusion region is also inpainted in real time, so that the method can be applied to a video. In addition, natural image inpainting corresponding to a viewpoint change in a 3D display is possible.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded on a medium in a variety of ways, with examples of the medium including recording media, such as magnetic storage media (e.g., ROM, floppy disks, hard disks, etc.) and optical recording media (e.g., CD-ROMs, or DVDs). The computer readable code can also be transferred on transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image inpainting method comprising:
    detecting an edge on the basis of a difference between depth values of pixels in a first image seen from a first viewpoint; and
    inpainting depth values of pixels in an occlusion region that is shown in a second image seen from a second viewpoint but not shown in the first image, in a direction from pixels in a region having high depth values among regions forming the edge to pixels in a region having low depth values.

2. The method of claim 1, wherein in inpainting the depth values, the depth values of the pixels in the occlusion region are determined on the basis of a depth value distribution of pixels adjacent to the occlusion region.

3. The method of claim 1, wherein a size of the occlusion region is proportional to a difference of a degree between the first and second viewpoints.

4. The method of claim 1, wherein a size of the occlusion region is proportional to a difference between the depth value of the region having the high depth values among the regions forming the edge and the depth value of the region having the low depth values.

5. The method of claim 1, wherein the occlusion region is a region that occurs when an object in the first image is hidden by another object having a depth value lower than that of the object and is not seen from the first viewpoint.

6. The method of claim 1, wherein in detecting the edge, a difference between color values of the pixels in the first image is further considered.

7. The method of claim 1, further comprising:
inpainting color values of the pixels in the occlusion region; and
inpainting the second image seen from the second viewpoint by using the inpainted depth values and color values and the first image.

8. The method of claim 7, wherein in inpainting the color values, a color value of each pixel is inpainted in a direction from the pixels in the region having the high depth values among the regions forming the edge to the pixels in the region having the low depth values.

9. The method of claim 7, wherein the inpainting of the color values of the pixels in the occlusion region and the inpainting of the depth values of the pixels in the occlusion region are performed simultaneously.

10. An image inpainting apparatus comprising:
an edge detector detecting an edge on the basis of a difference between depth values of pixels in a first image seen from a first viewpoint; and
a depth value inpainting unit inpainting depth values of pixels in an occlusion region that is shown in a second image seen from a second viewpoint but not shown in the first image, in a direction from pixels in a region having high depth values among regions forming the edge to pixels in a region having low depth values.

11. The apparatus of claim 10, wherein the depth value inpainting unit determines the depth values of the pixels in the occlusion region on the basis of a depth value distribution of pixels adjacent to the occlusion region.

12. The apparatus of claim 10, wherein a size of the occlusion region is proportional a difference of a degree between the first and second viewpoints.

13. The apparatus of claim 10, wherein a size of the occlusion region is proportional to a difference between the depth value of the region having the high depth values among the regions forming the edge and the depth value of the region having the low depth values.

14. The apparatus of claim 10, wherein the occlusion region is a region that occurs when an object in the first image is hidden by another object having a depth value lower than that of the object and is not seen from the first viewpoint.

15. The apparatus of claim 10, wherein the edge detector further considers a difference between color values of the pixels in the first image.

16. The apparatus of claim 10, further comprising:
an color value inpainting unit inpainting color values of the pixels in the occlusion region; and
an image inpainting unit inpainting the second image seen from the second viewpoint by using the inpainted depth values and color values and the first image.

17. The apparatus of claim 16, wherein the color value inpainting unit inpaints a color value of each pixel in a direction from the pixels in the region having the high depth values among the regions forming the edge to the pixels in the region having the low depth values.

18. The apparatus of claim 16, wherein the color value inpainting unit and the depth value inpainting unit simultaneously inpaint.

19. A non-transitory computer-readable recording medium having embodied thereon a computer program for the method of claim 1.

* * * * *

UNITED STATES PATENT AND TRADEMARK OFFICE
CERTIFICATE OF CORRECTION

PATENT NO.       : 8,218,893 B2                                    Page 1 of 1
APPLICATION NO.  : 12/216379
DATED            : July 10, 2012
INVENTOR(S)      : Hwa-sup Lim et al.

It is certified that error appears in the above-identified patent and that said Letters Patent is hereby corrected as shown below:

Column 10, Line 2, In Claim 12, after "proportional" insert -- to --.

Signed and Sealed this
Twentieth Day of November, 2012

David J. Kappos
*Director of the United States Patent and Trademark Office*